United States Patent [19]
Matsuda et al.

[11] Patent Number: 4,551,755
[45] Date of Patent: Nov. 5, 1985

[54] TELEVISION BANDWIDTH CORRECTING SYSTEM

[75] Inventors: Kouichi Matsuda; Youichi Sato, both of Tokyo, Japan

[73] Assignee: Pioneer Electronic Corporation, Tokyo, Japan

[21] Appl. No.: 566,448

[22] Filed: Dec. 28, 1983

[30] Foreign Application Priority Data

Dec. 28, 1982 [JP] Japan .................................. 57-22731

[51] Int. Cl.$^4$ .............................................. H04N 5/44
[52] U.S. Cl. ..................................... 358/188; 455/266; 358/191.1
[58] Field of Search .................. 358/188, 191.1, 193.1, 358/195.1; 455/266

[56] References Cited
U.S. PATENT DOCUMENTS 4,466,133 8/1984 Price .................................. 455/266

Primary Examiner—John C. Martin
Assistant Examiner—E. Anne Toth
Attorney, Agent, or Firm—Sughrue, Mion, Zinn Macpeak & Seas

[57] ABSTRACT

A television bandwidth correcting system for use with a television receiver or television tuner in which the quality of the displayed picture, defined by the bandwidth of the video signal, is accurately maintained for all input signal levels. Video and audio components are extracted from the intermediate frequency signal produced at the output of a bandwidth adjusting circuit. The levels of the extracted video and audio components are compared, and the result fed back to a bandwidth controlling input of the bandwidth adjusting circuit.

2 Claims, 6 Drawing Figures

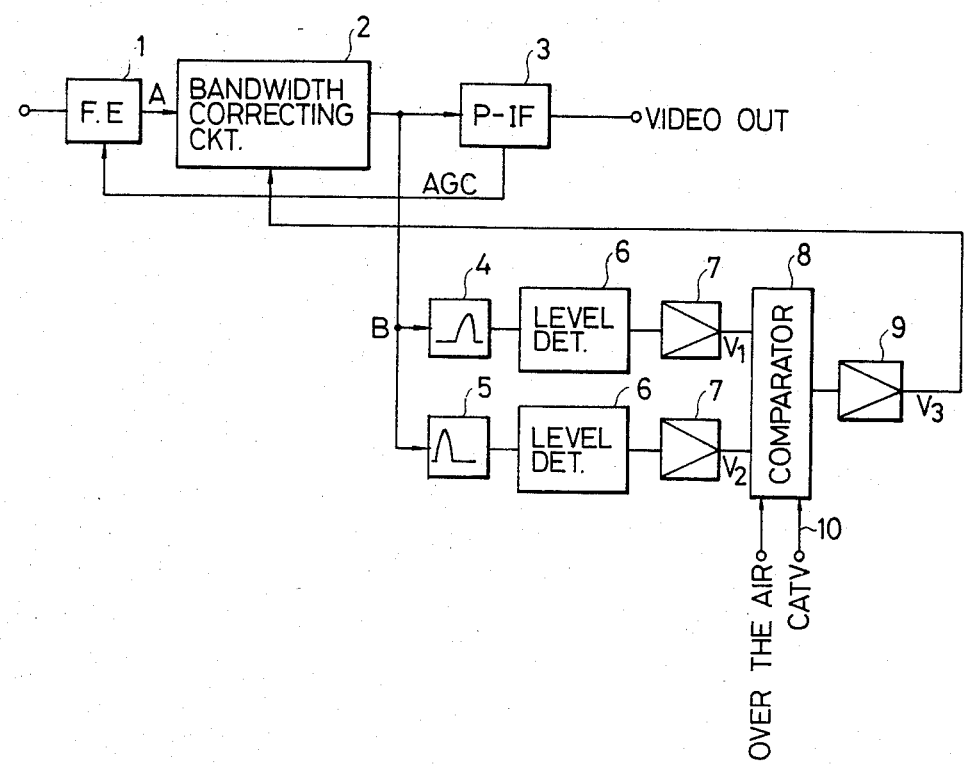
FIG. 4
FIG. 5
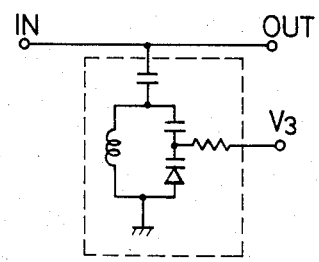
FIG. 6
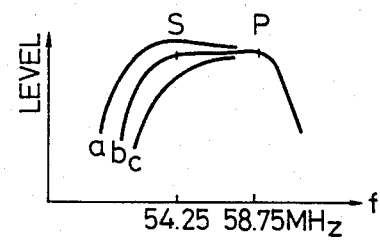

TELEVISION BANDWIDTH CORRECTING SYSTEM

BACKGROUND OF THE INVENTION

The present invention relates to a bandwidth correcting system for a television tuner.

A conventional circuit of this type is shown in FIGS. 1 and 2.

In FIG. 1, reference numeral 11 designates a front end section (RF amplifier, local oscillator, etc); 12, a video intermediate frequency amplifier circuit; and 13, a picture quality adjusting circuit, the output of which is applied to a video amplifier circuit (not shown).

An example of the picture quality adjusting circuit 13 is shown in FIG. 2. As the resistance of a variable resistor VR (enclosed by a dotted line) changes, the video signal frequency response characteric varies as indicated in FIG. 3. Accordingly, the picture quality can be made "hard" or "soft" by manually or automatically operating the variable resistor VR.

In the conventional circuit of FIG. 1, the frequency response characteristic of the intermediate frequency amplifier circuit is corrected after video detection has taken place. Therefore, if the audio intermediate frequency is at a high level at the input of the detector, then various signal beats (for instance, a beat at 920 KHz) will occur in the detector.

Accordingly, an object of the present invention is to provide a bandwidth correcting system in which the above-described difficulties accompanying a conventional video intermediate frequency amplifier circuit have been eliminated, wherein, even when the channel is switched or the input level changes, the resultant video signal has a predetermined desired frequency response characteristic.

SUMMARY OF THE INVENTION

In accordance with the above and other objects of the invention, a television bandwidth correcting system for use with a television receiver or television tuner is provided in which a control voltage applied to a bandwidth adjusting circuit provides a passband width which is determined by the relative levels of a video intermediate frequency signal and an audio intermediate frequency signal. More specifically, the output of a bandwidth adjusting circuit is applied to inputs of audio and video intermediate frequency filters. After suitable level detection and amplification, the video and audio signals are applied to respective inputs of a comparator. The buffered and amplified output of the comparator is fed back as a control signal to control the bandwidth provided by the bandwidth adjusting circuit. Further, provision is made for distinguishing between "OVER THE AIR" and "CATV" receiving modes so as to provide a constant picture quality, independent of the receiving mode.

BRIEF DESCRIPTION OF THE DRAWINGS

FIG. 4 is a block diagram showing a bandwidth correcting system according to one embodiment of the invention;

FIG. 5 is a circuit diagram of a bandwidth correcting circuit; and

FIG. 6 is a graphical representation showing an example of a bandwidth characteristic correction.

DESCRIPTION OF THE PREFERRED EMBODIMENTS

Figure 1:
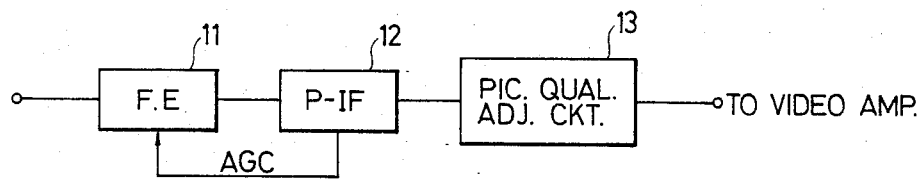
FIG. 1 is a block diagram of a conventional picture quality adjusting system.
Figure 2:
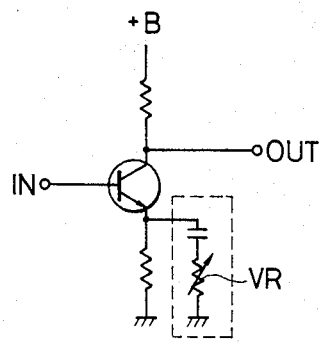
FIG. 2 is a circuit diagram of a picture quality adjusting circuit.
Figure 3:
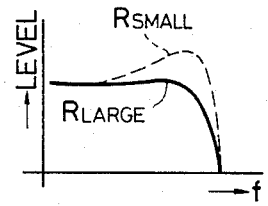
FIG. 3 is a graphical representation showing a frequency response characteristic for the conventional system of FIG. 1.

The invention will now be described with reference to FIGS. 4, 5 and 6.

FIG. 4 is a block diagram showing a television bandwidth correcting system constructed according to a preferred embodiment of the invention. In FIG. 4, reference numeral 1 designates a front end; 2, a bandwidth adjusting circuit; and 3, a video intermediate frequency amplifier circuit. These circuits form a signal path through which the ordinary signal passes.

An important feature of the invention is the provision of a circuit which compares the level of the video intermediate frequency signal with that of the audio intermediate frequency signal and applies the resultant difference signal, as a reference voltage, to the bandwidth adjusting circuit 2, and which also switches between "OVER THE AIR" operation and a "CATV" operation. This circuit includes a series circuit of a video intermediate frequency filter (58.75 MHz) 4, a level detector 6 and an amplifier 7, and a series circuit of an audio intermediate frequency filter (54.25 MHz) 5, a level detector 6 and an amplifier 7. The inputs of the filters 4 and 5 are connected to the circuit point B, the output DC voltage $V_1$ and $V_2$ of the amplifiers 7 are applied to a voltage comparator 8, and a voltage $V_s$, obtained through a DC amplifier 9, is fed back, as a reference voltage, to the bandwidth adjusting circuit 2.

The operation of the television bandwidth correcting system according to the invention will be described. It is here assumed that the bandwidth adjusting circuit 2 is a trap circuit as shown in FIG. 5, its standard frequency response characteristic is represented by the curve b in FIG. 6, and the video output has a standard frequency response characteristic (level and frequency characteristic). Furthermore, it is assumed that, at the circuit point B, the level difference between the video intermediate frequency signal (P) and the audio intermediate frequency signal (S) is 6 dB (for instance when the system's band characteristic is flat between the points P and S in FIG. 6), that the DC voltages $V_1$ and $V_2$, which are obtained by detecting the levels with the filters 4 and 5 which pass the respective carriers and by amplifying the levels thus detected, are applied to the comparator; and that the voltage $V_3$, which is provided by amplifying the output of the comparator, is applied, as the reference voltage, to the terminal $V_3$ in FIG. 5.

When the bandwidth characteristic at the circuit point A changes because the channel, the input level or the antenna matching condition is changed, the difference between the DC voltages $V_1$ and $V_2$ changes, and accordingly the output voltage $V_3$ of the DC amplifier 9 connected to the comparator 8 changes in such a manner as to restore the bandwidth characteristic at the circuit point B.

In other words, if the audio intermediate frequency signal (S) level of FIG. 6 decreases at any point between the input terminal and the circuit point A, the bandwidth adjusting circuit 2 varies the voltage $V_3$ so that the audio intermediate frequency signal (S) side is raised to follow the curve a in FIG. 6. On the other hand, if the audio intermediate frequency signal level is increased, the voltage $V_3$ varies so that the audio intermediate frequency signal (S) side is lowered to follow the curve c. Thus, the voltage $V_3$, which is fed back to the bandwidth adjusting circuit 2, forces the input condition for the video intermediate frequency amplifier circuit to be constant.

The above-described operation provides pictures having a stable quality at all times. The above description relates to the "OVER THE AIR" operation for which the standard level difference between the video intermediate frequency signal (P) and the audio intermediate frequency signal (S) is 6 dB. In the case of "CATV" operation, the standard level difference is 15 dB. In the latter case, a signal 10 is to adjust (scale) the comparison level for the comparator according to the selected operation so that the voltage $V_3$ provides an equivalent reference voltage under both conditions.

In the above-described embodiment, the trap circuit shown in FIG. 4 is employed as the bandwidth adjusting circuit 2; however, it may be replaced by a suitable tuning circuit.

Furthermore, in the above-described embodiment, the voltage comparison is effected in an analog mode using the comparator 8 and the DC amplifier 9; however, it may be carried out in a digital mode using a microcomputer, as in the case of a synthesized tuner.

As is apparent from the above description, according to the invention, variations in quality of the picture due to variations of external conditions are automatically corrected for. Thus, the picture is maintained unchanged in quality with the use of the invention.

The invention is effective especially when the antenna matching condition varies between channels, and it is considerably effective in the case of mobile equipment where the signal strength changes frequently and quickly.

We claim:

1. A television bandwidth correcting system for use in a television receiver or television tuner, comprising:
    a bandwidth adjusting circuit having a passband determined in accordance with a state of a signal applied to a bandwidth controlling input thereof, said bandwidth adjusting circuit receiving an input from a front end and having an output applied to an intermediate frequency amplifier of a television receiver;
    video and audio band filters for filtering out video and audio components, respectively, from said output of said bandwidth adjusting circuit;
    first and second level detecting means having inputs coupled to outputs of said video and audio band filters, respectively, for producing first and second signals representative of levels of video and audio components contained in a signal at said output of said bandwidth adjusting circuit; and
    a comparator for comparing said first and second signals, an output of said comparator being applied to said bandwidth controlling input of said bandwidth adjusting circuit.

2. The television bandwidth correcting system of claim 1, further comprising amplifying means disposed between outputs of said first and second level detectors and corresponding inputs of said comparator, and between said output of said comparator and said control input of said bandwidth adjusting circuit.

* * * * *